United States Patent
Matsui

(10) Patent No.: US 7,324,425 B2
(45) Date of Patent: Jan. 29, 2008

(54) OPTICAL DISK DEVICE HAVING MIRROR IN MICRO ELECTRICAL MECHANICAL SYSTEM

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 149 days.

(21) Appl. No.: 10/265,678

(22) Filed: Oct. 8, 2002

(65) Prior Publication Data

US 2003/0076754 A1 Apr. 24, 2003

(30) Foreign Application Priority Data

Oct. 23, 2001 (JP) ............................ P2001-325350

(51) Int. Cl.
G11B 7/09 (2006.01)
(52) U.S. Cl. ............................ 369/112.29; 369/44.17; 369/53.28
(58) Field of Classification Search ............ 369/44.17, 369/44.19, 44.22, 112.29
See application file for complete search history.

(56) References Cited

U.S. PATENT DOCUMENTS

| | | | | |
|---|---|---|---|---|
| 4,063,287 A | * | 12/1977 | VAN Rosmalen | 369/44.13 |
| 5,241,528 A | * | 8/1993 | Mohri et al. | 720/685 |
| 5,438,586 A | * | 8/1995 | Ishii et al. | 372/50.1 |
| 5,566,152 A | * | 10/1996 | Takamine et al. | 369/44.28 |
| 6,044,056 A | * | 3/2000 | Wilde et al. | 369/119 |
| 6,061,169 A | * | 5/2000 | Feldman et al. | 359/280 |
| 6,061,323 A | * | 5/2000 | Jerman et al. | 369/13.32 |
| 6,324,129 B1 | * | 11/2001 | Durnin et al. | 369/13.17 |
| 6,529,465 B2 | * | 3/2003 | Kase et al. | 369/112.24 |
| 6,657,927 B1 | * | 12/2003 | Awano et al. | 369/13.23 |
| 6,809,908 B1 | * | 10/2004 | Ito et al. | 360/317 |
| 6,914,871 B2 | * | 7/2005 | Hara et al. | 369/112.29 |

FOREIGN PATENT DOCUMENTS

| | | |
|---|---|---|
| JP | 2-23112 | 1/1990 |
| JP | 4-134635 | 5/1992 |
| JP | 5-28526 | 2/1993 |
| JP | 5-210855 | 8/1993 |
| JP | 6-325397 | 11/1994 |
| JP | 8-211320 | 8/1996 |
| JP | 8-235618 | 9/1996 |
| JP | 9-146031 | 6/1997 |
| JP | 9-146032 | 6/1997 |
| JP | 11-250489 | 9/1999 |

OTHER PUBLICATIONS

Machine translation of JP 08-235618 provided by the Japanese Patent Office website.*

* cited by examiner

*Primary Examiner*—Andrea Wellington
*Assistant Examiner*—Michael V Battaglia
(74) *Attorney, Agent, or Firm*—Morgan, Lewis & Bockius LLP

(57) ABSTRACT

An optical disk device in which the laser beam emitted from a laser light source and deflected by a movable mirror is focused on an optical recording medium by an optical head section. Tracking control is carried out by a drive control section based on the laser beam reflected from the optical recording medium. A micro electrical mechanical system incorporating the movable mirror is housed in a package accommodating the laser light source. The movable mirror is driven by electrostatic force at a frequency of 0.5 KHz or higher.

7 Claims, 5 Drawing Sheets

OPTICAL DISK DEVICE HAVING MIRROR IN MICRO ELECTRICAL MECHANICAL SYSTEM

BACKGROUND OF THE INVENTION

1. Field of the Invention

This invention relates to an optical disk device for making storage, reproduction and erasure of an optical disk having an information recording layer, such as a compact disk (CD), a digital versatile disk (DVD), a laser disk (LD), a magneto-optic disk (MO), a minidisk (MD), etc.

2. Description of the Related Art

As shown in FIG. 5, in an optical disk device 10 for recording information on an optical recording medium such as an optical disk 101 or reproducing the recorded information, a laser beam irradiated to an objective lens 105 arranged in the vicinity of the optical disk 101 is focused onto the optical disk 101. Information tracks 102 are formed on the optical disk 101. The laser beam reflected from the information track 102 of the optical disk 101 being rotated is read by a signal detecting system to reproduce the information. Since eccentricity occurs inevitably while the optical disk 101 is rotated, tracking control 103 and focusing control 104 are performed so that the laser beam accurately tracks the information tracks 102.

The conventional mechanism for the tracking control and focusing control in the optical disk device is disclosed in JP-A-5-28526, JP-A-5-210855, JP-A-2-23112, JP-A-6-325397 and JP-A-11-250489.

In an example of the conventional tracking control, a tracking actuator (not shown) shifts the objective lens 105 in a direction orthogonal to the optical axis of the laser beam and also drives a movable mirror 107 immediately in front of the objective lens 105 so that the focal point position (laser spot) of the laser beam is shifted in a radial direction of the optical disk, thereby applying alignment of the focal point position, i.e. tracking servo.

As the movable mirror 107, a micro electromechanical system 700 as shown in FIG. 6 can be used. The movable mirror 107 using the micro electromechanical system 700 includes a substrate 108 made of a square silicon wafer (having a thickness of 10 μm to 100 μm), a mirror section 108a formed on the substrate 108, two permanent magnets 109 to lie the substrate 108 therebetween, rotary shafts 110a and 110b formed on opposite sides of the substrate 108 respectively and making the substrate 108 rotatable within a predetermined angle, and a coil section 108c formed on the substrate 108. When a current passes through the coil section 108c, a rotational torque is generated by Lorentz force F ($F=\eta \times i \times B \times L$) based on the magnetic field B formed by the permanent magnets 109 and the current i crossing the magnetic field B so that the substrate 108 is rotated about the rotary shafts 110a and 110b. Thus, the focal point of the laser beam is controlled. Here, $\eta$ represents the efficiency and L represents the distance over which the current I flows perpendicularly to the direction of the magnetic field B.

As shown in FIG. 5, the movable mirror 107 is located at a position where the laser beam emitted from a laser light source 110 becomes parallel light, i.e. ahead of a collimator lens 111. The width (width of light rays) of the laser beam being the parallel light is wider than that of the laser beam immediately after emitted from the laser light source 110. The size of the movable mirror 107 need to be larger than the width of the laser beam being the parallel light to reflect the parallel light.

As a condition of the radius $\phi$ ($\phi=0.82 \cdot \lambda \cdot NA$) of the permissible circle of confusion at a depth of focus of the laser beam, the wave aberration (RMS wave aberration) of the focused laser beam $\lambda$rms need generally be included within $1/14$ times of the wavelength $\lambda$ of the laser beam ($1/14$ $\lambda$rms: "Marechal criterion") to read the information tracks 102 of the optical disk 101 accurately using the focused laser beam. The numerical aperture NA is represented by the product of the sinusoidal value of the angle formed by the optical axis of the laser beam and the periphery of the laser beam and the refractive index ($n \times \sin \alpha$).

Assuming the width of the laser beam being the parallel light is about 5 mm, in order to deflect this laser beam by the movable mirror 107 using the micro electromechanical system 700, the movable mirror 107 need be formed in the shape of a square in plan view, which is about 7 mm long and 5 mm wide. Since the substrate 108 of the movable mirror 107 is made of a silicon wafer which is 10 to 100 μm thick, the substrate 108 is distorted in a wave shape if the substrate is formed in a square which is about 7 mm long and 5 mm wide. Correspondingly, the mirror section 108a formed on the substrate 108 is also distorted, thus peaks and valleys are formed on the surface of the mirror section 108a. Therefore, owing to differences between the peaks and the valley, concavity and convexity having a size of about 0.1 mm appear on the surface of the mirror section 108a. As a result, when the surface of the mirror section 108a is irradiated with the laser beam being the parallel light of 5 mm width, the laser beam reflected from the mirror section 108a produces large wave aberration. The disorder in the wave aberration made it difficult to satisfy the condition of the effective wave aberration in the "Marechal criterion". Accordingly, a read error may occur when the information tracks 102 of the optical disk 101 are read using the focused laser beam. Thus, using the movable mirror 107 provided with the micro electromechanical system 700 is problematic.

Further, the conventional tracking control is difficult to increase the high-order resonance frequency so that it cannot enhance the gain of the tracking control (cannot increase the gain intersection point frequency) and is difficult to deal with the high speed rotation of the disk. Further, since the amplitude of an error signal which can be suppressed by the tracking control is within a range of about ±0.1 μm, the tracking of the laser spot for the information tracks of the optical disk should be improved.

SUMMARY OF THE INVENTION

This invention has been accomplished to solve the above problems, and intends to provide an optical disk device which can suppress the amplitude of an error signal and project the laser beam on an optical disk without disordering wave aberration.

In order to attain the above object, as shown in FIG. 1 for example, an optical disk device 6 according to the present invention comprises a laser light source 1a; a movable mirror 2 for deflecting a laser beam emitted from the laser light source; an optical head section 4 which focuses the laser beam deflected by the movable mirror on an optical recording medium (optical disk) 3; and a drive control section 5 which shifts the optical head section in a radial direction of the optical recording medium and drives the movable mirror based on the laser beam reflected from the optical recording medium to carry out tracking control. The movable mirror 2 is incorporated in a micro electrical mechanical system 7, the micro electrical mechanical system 7 incorporating the movable mirror is disposed in the vicinity of the laser light source 1a.

As shown in FIGS. 1 and 2, the drive control section 5 includes an actuator 5b and a control portion 5c for aligning the laser spot to detect the laser beam reflected from the optical storage medium thereby carrying out tracking control of the laser beam focused on the optical storage medium 3. The gain intersection frequency due to the shift of the optical head section 4 in the drive control section 5 may be set at 2 kHz to 3 kHz so that the error signal of the tracking control in a low frequency range is limited. Further, the gain intersection frequency due to the drive of the micro electrical mechanical system (MEMS) incorporating the movable mirror in the drive control section may be set at 20 KHz or higher so that the error signal of the tracking control in a high frequency range is limited.

Since the MEMS 7 incorporating the movable mirror 2 is arranged in the vicinity of the laser light source 1a, the laser beam emitted from the laser light source 1a incident on the movable mirror without being diverged. Since the width of the laser beam incident on the movable mirror 2 is narrowed, the movable mirror 2 can be formed in a small size. Therefore, the distortion of the movable mirror 2 substantially disappears so that the movable mirror 2 does not distort in the wave shape. Thus, the surface of the movable mirror 2 is maintained as a plane capable of limiting the wave aberration within a range of 0.01 λrms or less, and hence the wave aberration of the laser beam reflected by the movable mirror is not disordered. Accordingly, the resultant aberration can easily satisfy the condition of the effective wave aberration in the "Marechal criterion". As a result, the information tracks 3a of the optical disk 3 can be accurately tracked/traced by the focused laser beam.

Inclusion of the movable mirror 2 in the MEMS 7 enables the gain intersection frequency to be set at a high frequency. The conventional tracking control could suppress the amplitude of the error signal only in the range of ±0.1 mμ. However, combining the shift of the optical head 4 and drive of the movable mirror 2 by the drive control section 5 enables the gain intersection frequency to be set in a low frequency range and a high frequency range respectively so that the amplitude of the error signal in the tracking control can be suppressed in a range of ±0.01 mμ. Thus, the tracking capability of the laser spot for the information tracks 3 of the optical storage medium 3 can be improved, thereby tracking/tracing the information tracks 3a of the optical disk 3 at an accuracy ten times of that in the conventional tacking control.

Further, since the movable mirror 2 is driven by electrostatic force, a relatively large driving source such as a piezoelectric element, magnet, coil, etc. is not required. Thus, the size of the optical disk device can be made compact.

Further, since the movable mirror 2 is driven at a frequency of 0.5 KHz or higher, the focusing point of the laser spot can be moved at a high speed in the radial direction of the optical disk 3. This enables the error signal in the tracking control to be instantaneously dealt with.

Further, since the MEMS 7 incorporating the movable mirror 2 is housed in a package 1 accommodating the laser light source 1a, the movable mirror 2 can be disposed very close to the laser light source 1a. Therefore, the movable mirror 2 can be formed in a small size. Thrus, the distortion of wave aberration of the laser beam reflected from the movable mirror 2 can be further suppressed. Accordingly, the resultant aberration can easily satisfy the condition of the effective wave aberration in the "Marechal criterion". As a result, the information tracks 3a of the optical disk 3 can be accurately tracked/traced by the focused laser beam.

DETAILED DESCRIPTION OF THE PREFFERED EMBODIMENTS

The present invention will be described below with reference to the accompanying drawings.

First Embodiment

Figure 1:
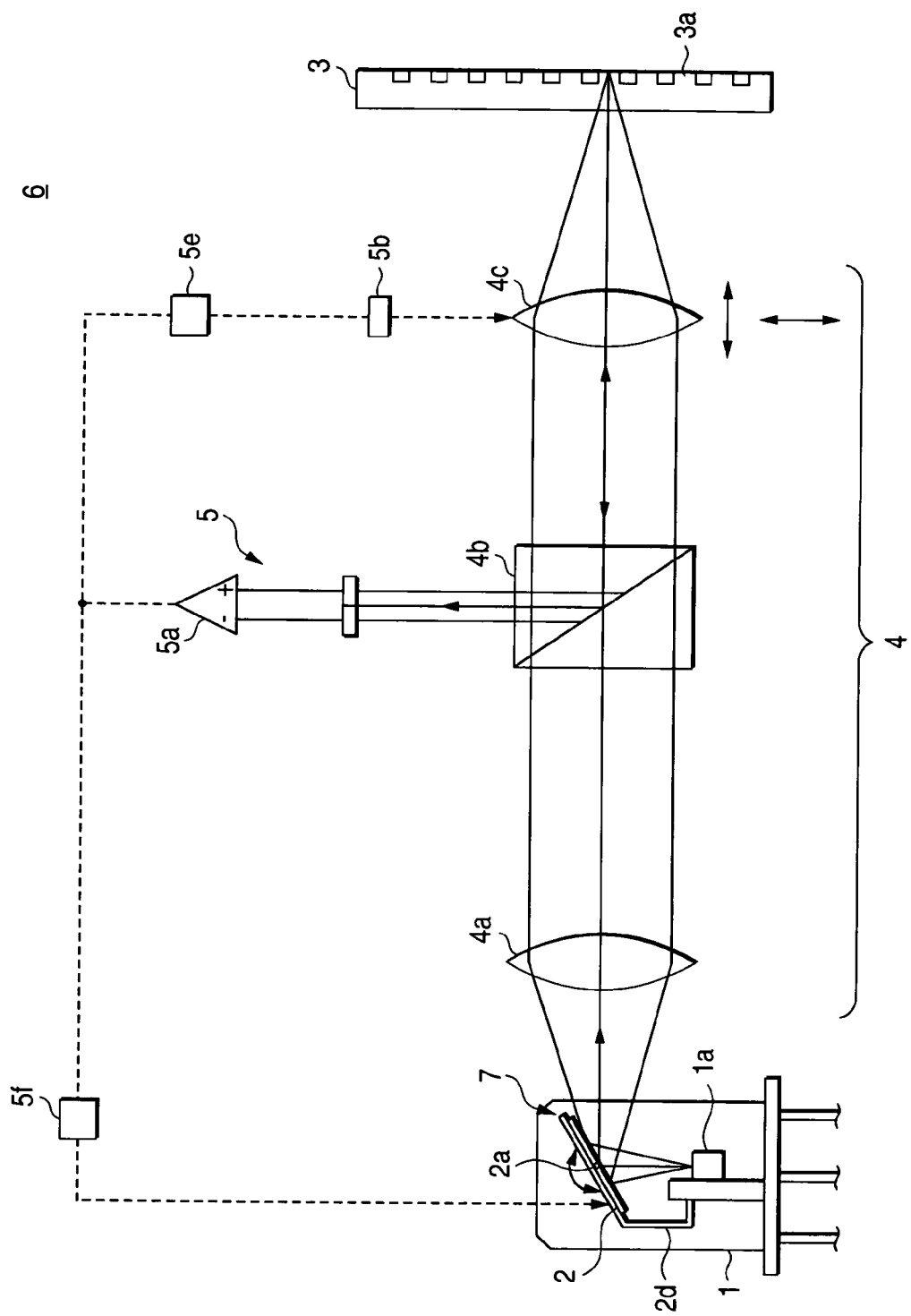
FIG. 1 is a longitudinal sectional view of an optical disk device according to the present invention.

As shown in FIG. 1, an optical disk device 6 includes a movable mirror 2 for deflecting the laser beam emitted from a laser light source 1a, an optical head 4 for focusing the deflected laser beam on an optical recording medium (optical disk 3), and a derive control section 5 for detecting the laser beam reflected from the optical recording medium 3 and tracking-controlling the optical head 4 and the movable mirror 2 on the basis of the laser beam thus detected.

Figure 2:
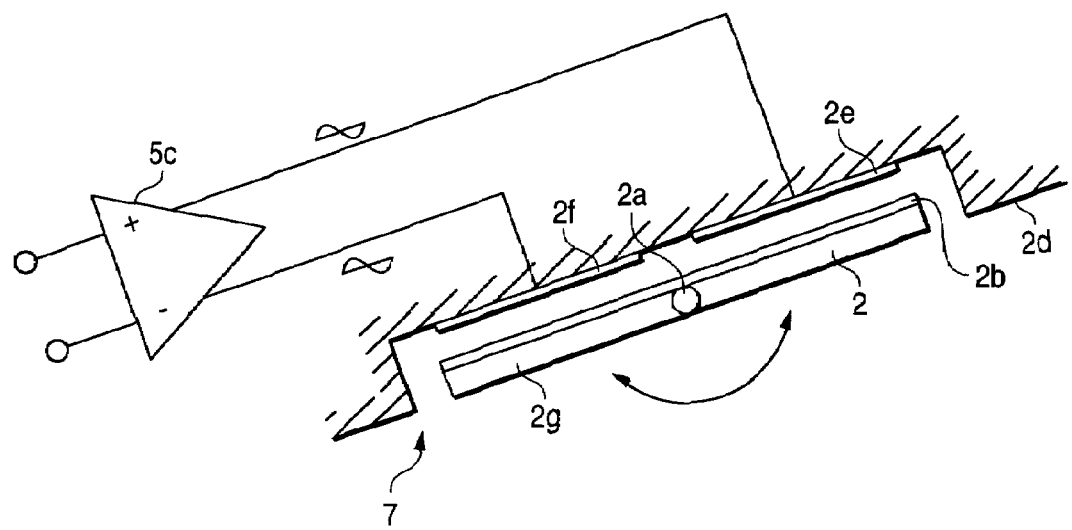
FIG. 2 is a longitudinal sectional view of a micro electrical mechanical system which is driven by electrostatic force and used in the optical disk device.

The movable mirror 2, as shown in FIGS. 1 and 2, is included in a micro electrical mechanical system (MEMS). The MEMS 7 including the movable mirror 2 is housed within a package 1 which accommodates the laser light source 1a.

The MEMS 7 includes the movable mirror 2 having a pair of rotary shafts 2a attached to side portions 2g of the mirror 2. The mirror 2 is formed in the shape of a square in plan view. The MEMS 7 further includes a film 2b put on an upper surface of the movable mirror 2, and two films 2e and 2f put on a substrate 2d located above the mirror 2. The film 2b includes a resistive layer having a slight conductor and is connected to ground. The two films 2e and 2f are covered, in their surfaces, with an insulating material. The two films 2e and 2f are put on the substrate 2d to be apart from each other by a predetermined distance with respect to the rotary shaft 2a. The two films 2e and 2f can be charged with positive and negative charges by a control portion 5c, which affects the charged state of the film 2b. By attractive force due to the electrostatic force which is generated by the charged state of the films 2b, 2e and 2f, the rotatable mirror 2 can be rotated at 0.5 KHz or higher about the rotary shafts 2a so that the laser spot can be aligned.

The optical head section 4 serves to form the laser spot on a information track 3a of the optical disk 3 from the focused laser beam. The optical head section 4 includes a collimate lens 4a for collimating the laser beam deflected by the movable mirror 2 into parallel light, an objective lens 4c for focusing the parallel light to be focused on the optical disk 3, and a polarized beam splitter 4b for separating the laser beam emitted from the laser light source 1a and the laser beam reflected from the information track 3a of the optical disk 3.

The drive control section 5 includes a computing portion for detecting the laser beam reflected from the information track 3a of the optical disk 3 to compute displacement of the position of the laser beam incident on the information track 3a of the optical disk 3, an actuator 5b for shifting the objective lens 4c in a radial direction of the optical disk 3, and a control portion 5c for rotating the movable mirror 2 to a predetermined angle. A first phase compensator 5e for compensating the phase of a control signal is located between the computing portion 5a and the actuator 5b. A second phase compensator 5f for compensating the phase of a control signal is located between the computing portion 5a and the control portion 5c. The drive control section 5 transmits the control signal to the actuator 5b and control portion 5c respectively on the basis of the computed result from the computing portion 5a to shift the objective lens 4 and also makes the tracking control of rotating the rotatable mirror 2 to align the laser spot.

The operation of tracking control of the optical disk device 6 according to the first embodiment is described below.

The optical disk 3 is rotated at a predetermined speed by a motor control circuit (not shown), and the laser beam is emitted from the laser light source 1a in the package 1. The emitted laser beam is incident on the movable mirror 2 as divergent light and deflected by the movable mirror 2 to be incident on the collimate lens 4a. The laser beam incident on the collimate lens 4a is collimated into the parallel light which is in turn incident on the polarized beam splitter 4b. The laser beam passed through the polarized beam splitter 4b is incident on the objective lens 4c. Thus, the laser beam becomes converged light which is focused on the information track 3a of the optical disk 3. Further, the laser beam reflected from the information track 3a of the optical disk 3 passes through the objective lens and is separated from the laser beam from the laser beam incident on the optical disk 3 by the polarized beam splitter 4b. The separated laser beam is incident on the drive control section 5.

On the basis of the detected position of the laser beam incident on the drive control section 5, the computing portion 5a computes the displacement of the laser beam focused on the information track 3a of the optical disk 3 and transmits the control signal to the actuator 5b and the control portion 5c respectively through the first and the second phase compensators 5e and 5f. Using the control signal received by the actuator 5b, the objective lens 4c is shifted in the radial direction of the optical disk 3.

Using the control signal received by the control potion 5c, a slight AC electric signal is supplied to the one film 2e of the two films 2e and 2f so that attractive force due to the slight electrostatic force is generated between the film 2e supplied with the AC electric signal and the one half side of the film 2b with respect to the rotary shafts 2a (right half side in FIG. 2). By this attractive force, the gradient of the movable mirror 2 is changed and thereafter, the generated attractive force due to the electrostatic force is annihilated by connecting the film 2b to ground. Then, using the next control signal received by the control potion 5c, a next slight AC electric signal is supplied to the other film 2f so that attractive force due to the slight electrostatic force is generated between the film 2f supplied with the AC electric signal and the other half side of the film 2b with respect to the rotary shafts 2a (left half side in FIG. 2). By this attractive force, the gradient of the movable mirror 2 inclined in one direction is inclined in the other direction and thereafter, the generated attractive force due to the electrostatic force is annihilated by connecting the film 2b to ground. Thus, by changing the AC electric current supplied to the films 2e and 2f on the basis of the control signal received by the control portion 5c, the movable mirror 2 is rotated to a predetermined angle about a shaft (rotary shafts 2a) which perpendicularly extends with respect to the paper plane of FIG. 2. Accordingly, by controlling the shift of the objective lens 4c and the rotation of the movable mirror 2 with the aid of the computing portion 5a of the drive control section, the alignment of the laser spot focused on the information track 3a of the optical disk 3 can be performed.

According to the first embodiment, since the MEMS 7 incorporating the movable mirror 2 is housed in the package 1 accommodating the laser light source 1a, the movable mirror 2 can be disposed very close to the laser light source 1a. For this reason, without being diverged so greatly, the laser beam emitted from the laser light source 1a can be caused to be incident on the movable mirror 2. Since the width of the laser beam incident on the movable mirror 2 is narrowed, the movable mirror 2 can be formed in a small size. Thus, the distortion of the movable mirror 2 substantially disappears so that the movable mirror 2 does not distort in the wave shape. Therefore, the surface of the movable mirror 2 can be maintained as a plane capable of limiting the wave aberration within a range of 0.01 $\lambda$rms or less, and hence the wave aberration of the laser beam reflected by the movable mirror is not disordered. Accordingly, the resultant aberration can easily satisfy the condition of the effective wave aberration in the "Marechal criterion". As a result, the information track 3a of the optical disk 3 can be accurately tracked/traced by the focused laser beam.

Inclusion of the movable mirror 2 in the MEMS 7 enables the gain intersection frequency to be set at a high frequency. The conventional tracking control could suppress the amplitude of the error signal only in the range of $\pm 0.1$ m$\mu$. However, combining the shift of the optical head 4 and drive of the movable mirror 2 by the drive control section 5 enables the gain intersection frequency to be set in a low frequency range and a high frequency range respectively so that the amplitude of the error signal in the tracking control can be suppressed in a range of $\pm 0.01$ m$\mu$. Thus, the tracking capability of the laser spot for the information track 3 of the optical storage medium 3 can be improved, thereby tracking/tracing the information track 3a of the optical disk 3 at an accuracy ten times of that in the conventional tacking control.

Further, since the movable mirror 2 is driven by the electrostatic force due to the charging of two kinds of films 2b and 2c, a relatively large driving source such as a piezoelectric element, magnet, coil, etc. is not required. For this reason, the size of the optical disk device can be made compact.

Further, since the movable mirror 2 is driven at a frequency of 0.5 KHz or higher about the rotary shafts 2a, the focusing point of the laser spot can be moved at a high speed in the radial direction of the optical disk 3. This enables the error signal in the tracking control to be instantaneously dealt with.

Second Embodiment

The optical disk according to a second embodiment is different from the first embodiment in only the configuration of the MEMS, and has almost the same elements as in the first embodiment. Therefore, the other elements than the MEMS are not described here.

Figure 3:
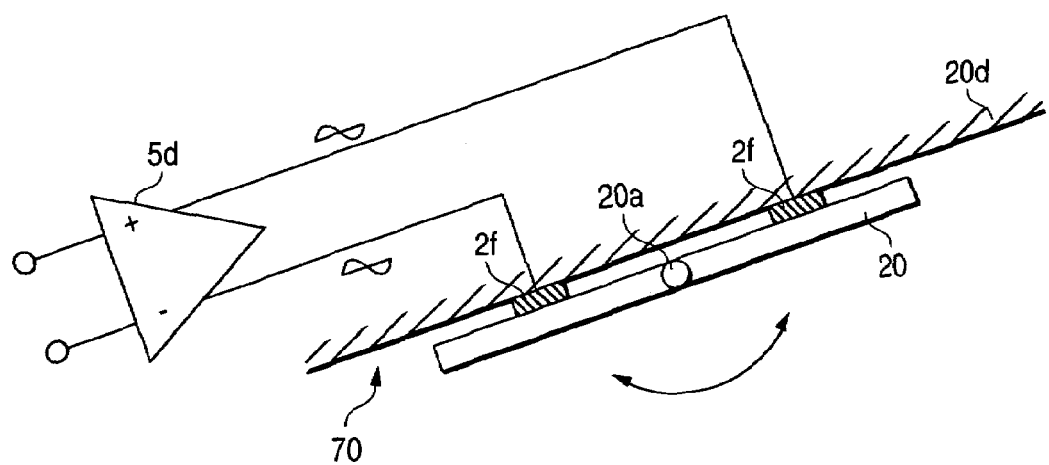
FIG. 3 is a longitudinal sectional view of a micro electrical mechanical system which is driven by piezoelectric force and used in an optical disk device according to a second embodiment of the present invention.

As shown in FIGS. 1 and 3, a movable mirror 20 is included in a MEMS 70 as in the first embodiment. The MEMS 70 including the movable mirror 2 is housed within the package 1 which accommodates the laser light source 1a.

As in the first embodiment, the MEMS 70 includes the movable mirror 20 equipped with a pair of rotary shaft 20a, two piezoelectric elements 2f, 2f attached to a substrate 20d located above the movable mirror 20. The two piezoelectric elements 2f, 2f are made of e.g. copolymer of PVDF (polyvinylidene fluoride) and ethylene trifluoride. The two piezoelectric elements 2f, 2f are put on the substrate 2d to be apart from each other by a predetermined distance with respect to the rotary shafts 20a. The two piezoelectric elements 2f, 2f are supplied with an AC electric signal from the control portion 5d of the drive control section 5. By the expansion/contraction operation due to the piezoelectric effect of the piezoelectric elements 2f, 2f, the rotatable mirror 2 can be rotated at a frequency of 0.5 KHz or higher around the rotary shaft 2a so that the laser spot can be aligned.

The operation of tracking control of the optical disk device 6 according to the second embodiment is described below.

The operation until the laser beam emitted from the laser light source 1a is incident on the drive control section 5, which is the same as in the first embodiment, is not described here.

As in the first embodiment, on the basis of the detected position of the laser beam incident on the drive control section 5, the computing portion 5a computes the displacement of the laser beam focused on the information track 3a of the optical disk 3 and transmits the control signal to the actuator 5b and the control portion 5c respectively through the first and the second phase compensators 5e and 5f. Using the control signal received by the actuator 5b, the objective lens 4c is shifted in the radial direction of the optical disk 3.

Using the control signal received by the control potion 5c, a slight AC electric signal is supplied to the two piezoelectric elements 2f, 2f so that the two piezoelectric elements 2f, 2f expand/contract owing to the AC electric signal. Therefore, by changing the AC electric signal supplied to the two piezoelectric elements 2f, 2f, the expansion/contraction state of the two piezoelectric elements is changed. Therefore, the upper surface of the movable mirror 20 located below the two piezoelectric elements 2f, 2f is pushed so that the rotatable mirror 2 is rotated to a predetermined angle about the shaft (rotary shaft 20a) which perpendicularly extends with respect to the paper plane of FIG. 3. Accordingly, by controlling the shift of the objective lens 4c and the rotation of the movable mirror 2 with the aid of the computing portion 5a of the drive control section 5, the alignment of the laser spot focused on the information track 3a of the optical disk 3 can be performed.

Third Embodiment

The optical disk according to a third embodiment is different from the first and second embodiment in only the configuration of the MEMS, and has almost the same elements as in the first and second embodiment. Therefore, the other elements than the MEMS are not described here.

Figure 4:
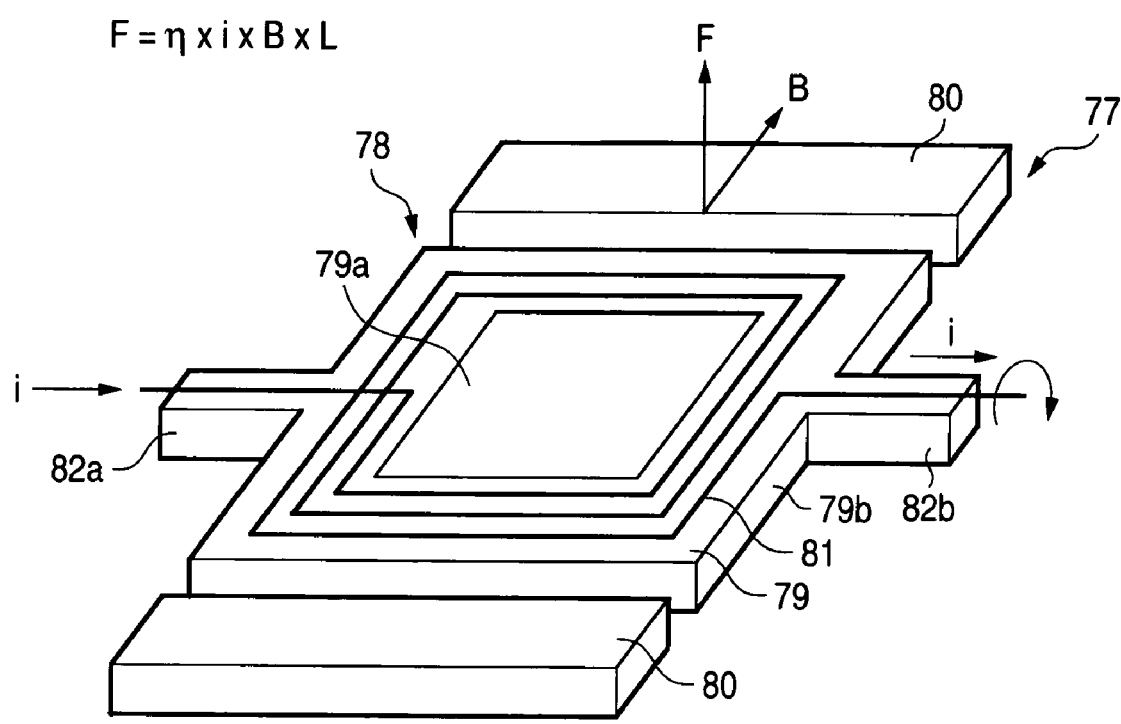
FIG. 4 is a longitudinal sectional view of a micro electrical mechanical system which is driven by Lorentz force and used in an optical disk device according to a third embodiment of the present invention.
Figure 5:
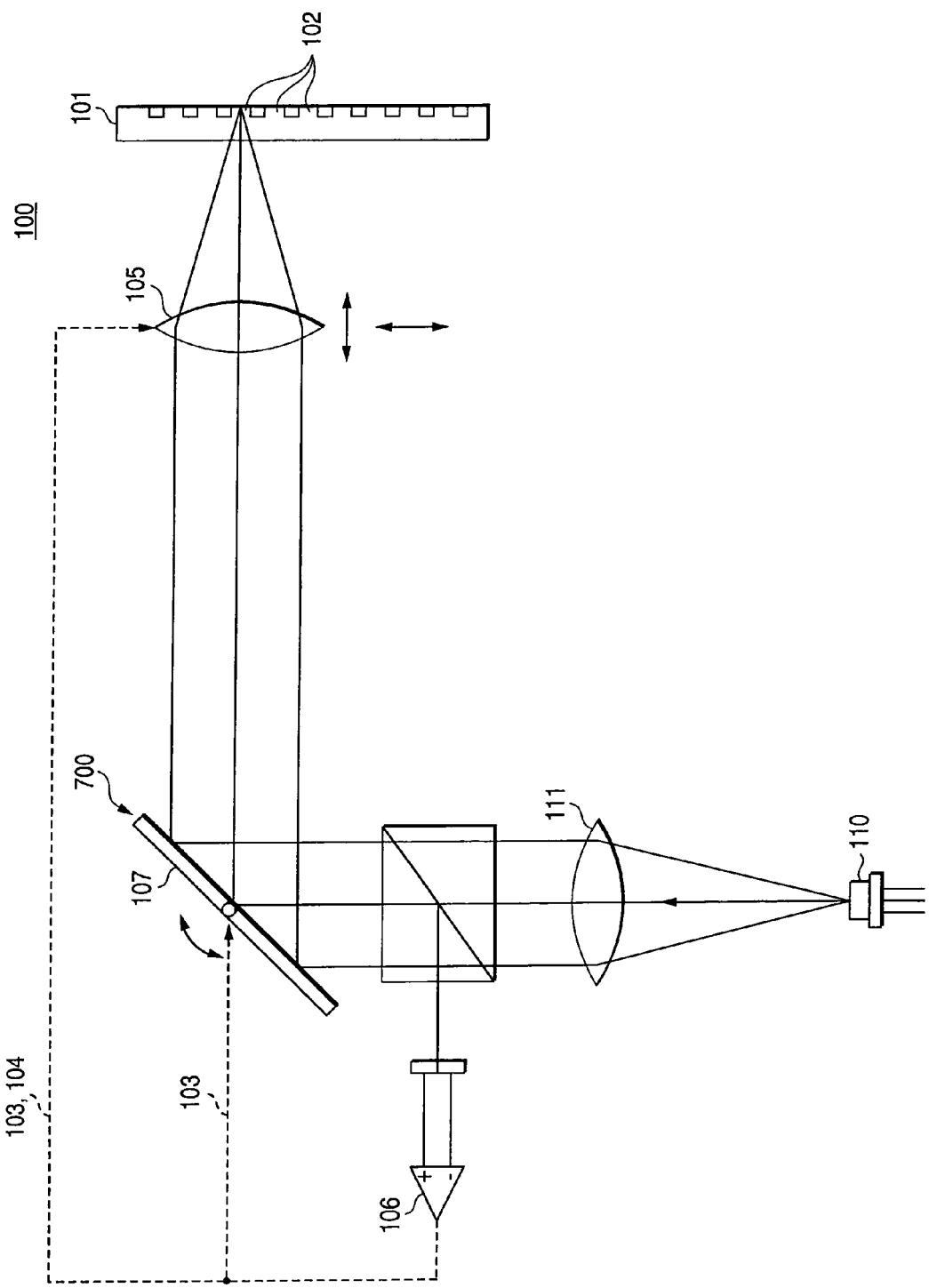
FIG. 5 is a longitudinal sectional view of a conventional optical disk device.
Figure 6:
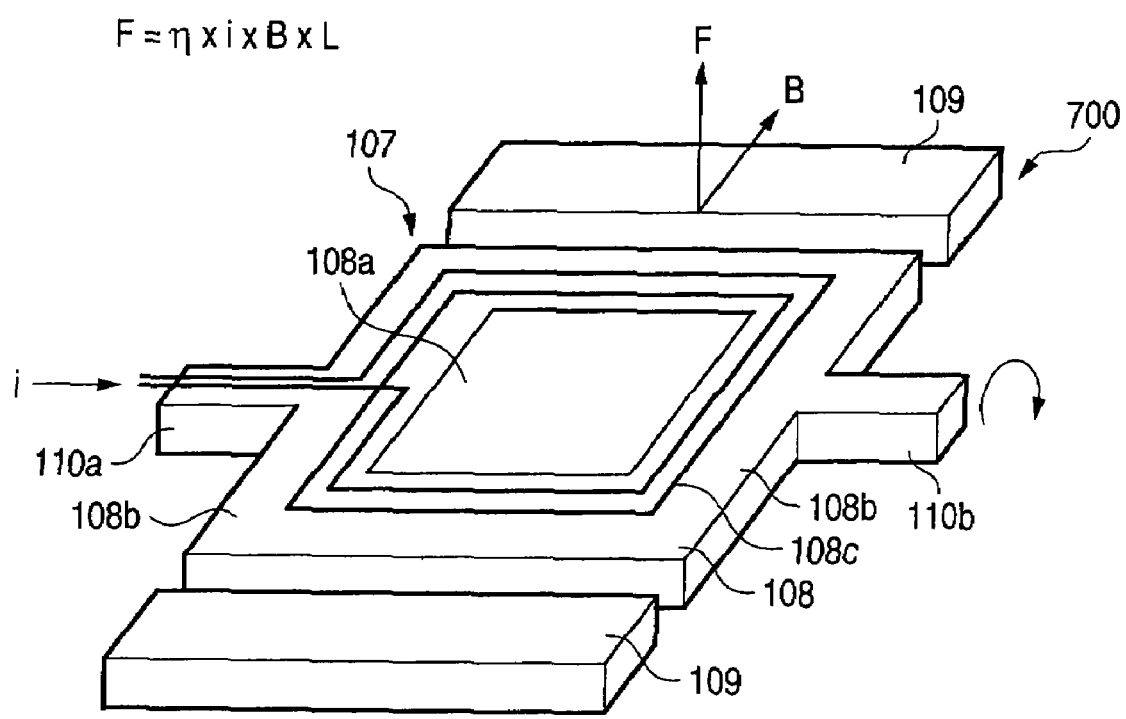
FIG. 6 is a longitudinal sectional view of a micro electrical mechanical system which is driven by Lorentz force and used in the conventional optical disk device.

As shown in FIGS. 1 and 4, a movable mirror 78 is included in a MEMS 77, like the first and the second embodiment. The MEMS 77 including the movable mirror 78 is housed within the package 1 which accommodates the laser light source 1a.

The MEMS 77 includes a substrate 79 made of a square silicon wafer, a mirror section 79a formed on the substrate 79, two permanent magnets 80 to lie the substrate 79 therebetween, rotary shafts 82a and 82b formed on opposite sides 79b of the substrate 79 respectively, which make the substrate 79 rotatable within a predetermined angle, and a coil section 81 formed on the substrate 79. When a current is passed through the coil section 81, a running torque is generated by Lorentz force F ($F=\eta \times i \times B \times L$) based on the magnetic field B formed by the permanent magnets 80 and the current i crossing the magnetic field B so that the substrate 79 is rotated at a frequency of 0.5 KHz or higher about the rotary shafts 82a and 82b. Thus, the laser beam can be aligned. Here, $\eta$ represents the efficiency and L represents the distance over which the current I flows perpendicularly to the direction of the magnetic field B.

The operation of tracking control of the optical disk device 6 according to the third embodiment is described below.

The operation until the laser beam emitted from the laser light source 1a is incident on the drive control section 5, which is the same as in the first and second embodiment, is not described here.

Like in the first and the second embodiment, on the basis of the detected position of the laser beam incident on the drive control section 5, the computing portion 5a computes the displacement of the laser beam focused on the information track 3a of the optical disk 3 and transmits the control signal to the actuator 5b and the control portion (not shown) respectively through the first and the second phase compensators 5e and 5f. Using the control signal received by the actuator 5b, the objective lens 4c is shifted in the radial direction of the optical disk 3.

Owing to the control signal received by the control portion, a current i flows from the side of the one rotary shaft of the movable mirror 78, passes through the coil section 81 on the substrate 79 and flows into the other rotary shaft 82b. In this case, owing to the current I, a running torque is generated by Lorentz force F based on the magnetic field B formed by the permanent magnets 80 and the current i crossing the magnetic field B so that the substrate 79 is rotated to a predetermined angle about the rotary shafts 82a and 82b of the movable mirror 78. For this reason, by controlling the shift of the objective lens 4c and the rotation of the movable mirror 78 with the aid of the computing portion 5a of the drive control section 5, the alignment of the laser spot focused on the information track 3a of the optical disk 3 can be made.

According to the second and the third embodiment, the same effect as in the first embodiment can be provided. In addition, since the MEMS 70, 77 incorporating the movable mirror 20, 78 can also rotate the movable mirror 20, 78 using the piezoelectric force or Lorentz force about the rotary shafts 20a; 82a, 82b, the method for rotating the movable mirror 20, 78 can be suitably determined according to various conditions in design.

The optical disk device according to this invention should not be limited to the first to third embodiments.

For example, the MEMS incorporating the movable mirror may be arranged on the optical axis apart from the package by about 1 mm without being arranged within the package. In this case, the size of the movable mirror becomes larger than that of the movable mirror 2, 20, 78 in the first to third embodiments, but may be optional as long as the condition of the effective wave aberration in the "Marechal criterion" can be satisfied. Further, the movable mirror arranged outside the package can be driven any of the electrostatic force, piezoelectric force and Lorentz force so that the method for rotating the movable mirror 20, 78 can be suitably determined according to various conditions in design.

According to the present invention, the tracking capability of the laser spot for the information track of an optical storage medium can be improved to satisfy easily the condition of the effective wave aberration in the "Marechal criterion". Thus, the information tracks of the optical recording medium can be traced by the focused laser beam at an accuracy ten times of that in the conventional tacking control.

What is claimed is:

1. An optical disk device comprising:
   a laser diode;
   a movable mirror operable to deflect a laser beam emitted directly from the laser diode, the movable mirror disposed in such a position that the laser beam is incident on the movable mirror as divergent light along an unimpeded light pathway without being converted to parallel light;
   a package housing the laser diode and the movable mirror;
   an optical head section disposed outside the package, and adapted to focus the laser beam deflected by the movable mirror on an optical recording medium; and
   a drive control section operable to shift the optical head section in a radial direction of the optical recording medium and to drive the movable mirror based on the laser beam reflected from the optical recording medium to carry out tracking control,
   wherein the movable mirror is incorporated in a micro electrical mechanical system and is disposed adjacent to the laser diode,
   wherein the laser beam deflected by the movable mirror goes outside the package without optical modification.

2. An optical disk device according to claim 1, wherein the movable mirror is driven by electrostatic force.

3. An optical disk device according to claim 1, wherein the movable mirror is driven at a frequency of 0.5 KHz or higher.

4. An optical disk device according to claim 1, wherein the package is optically transparent.

5. An optical disk device according to claim 4, wherein the movable mirror is located nearest in position to the laser diode along the unimpeded light pathway within the package.

6. An optical disk device according to claim 4, wherein the package is substantially cylindrical in shape.

7. An optical disk device according to claim 1, wherein the movable mirror has a wave aberration of 0.01 $\lambda$rms or less.

* * * * *